United States Patent
Bauer

(10) Patent No.: US 8,770,378 B2
(45) Date of Patent: Jul. 8, 2014

(54) APPARATUS FOR THE SUPPLY OF PRODUCTS

(75) Inventor: Sigfrid Bauer, Groβ Teetszleben (DE)

(73) Assignee: Weber Maschinenbau GmbH Breidenbach (DE)

(*) Notice: Subject to any disclaimer, the term of this patent is extended or adjusted under 35 U.S.C. 154(b) by 0 days.

(21) Appl. No.: 13/448,824

(22) Filed: Apr. 17, 2012

(65) Prior Publication Data

US 2013/0153364 A1 Jun. 20, 2013

(30) Foreign Application Priority Data

Apr. 18, 2011 (DE) .......................... 10 2011 017 420

(51) Int. Cl.
*B65G 21/12* (2006.01)
*B65G 47/64* (2006.01)

(52) U.S. Cl.
CPC .............. *B65G 47/647* (2013.01); *B65G 21/12* (2013.01)
USPC ...................... 198/369.2; 198/589; 198/861.5

(58) Field of Classification Search
USPC .............. 198/318, 369.2, 370.05, 589, 861.5
See application file for complete search history.

(56) References Cited

U.S. PATENT DOCUMENTS

| | | | |
|---|---|---|---|
| 4,809,842 A | | 3/1989 | Aquino et al. |
| 5,909,796 A | * | 6/1999 | Soldavini ................... 198/369.2 |
| 2002/0104736 A1 | * | 8/2002 | Peppel et al. .............. 198/369.2 |
| 2002/0166752 A1 | | 11/2002 | Takahashi |
| 2003/0019719 A1 | * | 1/2003 | Wiehler ...................... 198/369.2 |

FOREIGN PATENT DOCUMENTS

| | | |
|---|---|---|
| AT | E48265 B | 11/1989 |
| DE | 102009039826 A1 | 3/2011 |
| EP | 0030653 | 6/1981 |
| EP | 0879774 A1 | 11/1998 |
| EP | 1666390 A1 | 6/2006 |
| GB | 820731 A1 | 9/1959 |
| GB | 2320235 A | 6/1998 |

OTHER PUBLICATIONS

German Search Report of German Application DE 102011017420.6; Filing Date Apr. 18, 2011; Mailing date Sep. 29, 2011, 5 pages and English translation.
European Search Report relating to European Patent Application No. 12164270.6, dated Jul. 24, 2012 and translation thereof.

* cited by examiner

*Primary Examiner* — Mark A Deuble
(74) *Attorney, Agent, or Firm* — Cantor Colburn LLP

(57) ABSTRACT

An apparatus for conveying products comprising at least one conveyor device being drivable by a drive shaft in order to supply the products to each of a plurality of output regions, wherein said conveyor device comprises a support structure which can be pivoted about an axis of rotation of said drive shaft for individually changing said output region. Said support structure is pivotably supported by a jointed arm arrangement at a support element spaced apart from said drive shaft such that, by moving said jointed arm arrangement, said support structure is pivotable about said axis of rotation of said drive shaft.

17 Claims, 5 Drawing Sheets

APPARATUS FOR THE SUPPLY OF PRODUCTS

CROSS-REFERENCE TO RELATED APPLICATIONS

This patent application claims the benefit of priority to German Patent Application Serial No. 102011017420.6, filed Apr. 18, 2011, which is incorporated herein by reference in its entirety.

FIELD OF THE INVENTION

The present invention relates to an apparatus for conveying products, in particular food products, with at least one conveyor device being drivable by a drive shaft in order to convey the products to a respective one of a plurality of output regions, wherein the conveyor device comprises a support structure which can be pivoted about an axis of rotation of the drive shaft for individually changing the output area.

BACKGROUND

Such an apparatus is used, for example, to transport food products such as meat, sausage or cheese in portions from a slicing device, such as a high-performance slicer, to a packaging machine. By changing the output region, product portions of incorrect weight can be expelled from the product flow as they are supplied to a separate conveyor apparatus or to a collection container. By providing a plurality of adjacently arranged conveyor devices, it is possible within the framework of a multi-lane product flow to achieve a relatively high conveying performance. In this respect, a drive shaft common to all conveyor device shafts can save the expense for providing a plurality of drives, each independent of one another, as well as the associated actuating devices. The support structure can, for example, be a rocker table which is pivotally supported at the drive shaft.

In particular, for a plurality of adjacently arranged conveyor devices, the problem arises in this respect, however, that a plurality of pivot bearings must be provided, which must have a correspondingly low-friction design due to the generally relatively high rotational speed of the drive shaft. Roller element bearings with appropriate seals can, for example, be used. This, however, gives rise to problems in the production of the drive shaft since the stringent tolerance requirements for the bearing seats have to be satisfied along the entire length of the drive shaft. There are also problems in the installation, maintenance and repair, because the bearing seats located in the central region of the drive shaft are in particular not easily accessible. In addition, the overall structure of the apparatus is relatively complex and error-proneness is increased correspondingly.

It is therefore a feature of the invention to reduce the production expense for an apparatus of the named kind and to enable a simpler installation and repair.

BRIEF DESCRIPTION OF THE INVENTION

The above-referenced feature is provided by an apparatus for conveying products including at least one conveyor device which is drivable by a drive shaft in order to supply said products to one of a plurality of output areas. The conveyor device comprises a support structure which is pivotable for individually changing said output regions about an axis of rotation of the drive shaft. The support structure is pivotably supported by a jointed arm arrangement at a support element spaced apart from said drive shaft such that, by moving said jointed arm arrangement, said support structure is pivotable about said axis of rotation of said drive shaft.

According to an embodiment of the invention, the support structure is movably supported by a jointed arm arrangement at a support element spaced apart from the drive shaft such that by moving the jointed arm arrangement, the support structure can be pivoted about the drive shaft's axis of rotation. The support structure is therefore pivoted about a virtual axis of rotation which coincides with the drive shaft's axis of rotation. Due to the support structure being supported at an element spaced apart from the drive shaft, a real pivot connection, i.e. a structural pivot connection, between the support structure and the drive shaft can be omitted, whereby the respective bearings and seals can be saved. Since the support element does not need to rotate at the rotational speed of the drive shaft, simple, inexpensive and reliable sliding bearings can be used instead of roller element bearings for supporting the jointed arm arrangement at the support element. This increases the life cycle of the conveyor apparatus and reduces failure-related downtimes. Avoiding a real pivot connection between the support structure and the drive shaft is also advantageous from a hygienic perspective. The support element may be rigid and in particular fixed to the housing. In so far as several conveyor devices are provided, a common support element may be provided for all conveyor devices in order to save effort and costs.

Typically, there may be no supporting connection between the support structure and the drive shaft. In other words, the support structure is mechanically decoupled from the drive shaft, except for a drive connection, such as a revolving conveyor belt. Since, therefore, no bearing seats with stringent tolerance requirements have to be provided at the drive shaft, the manufacturing and assembly costs can be substantially reduced. A more simple cleaning is also possible due to the lack of the mechanical supporting connection. There is also the possibility of a simplified safety concept for the apparatus.

According to an embodiment of the invention, the support element extends parallel to the drive shaft. The support element can e.g. be a cylindrical rod whose longitudinal axis is arranged parallel to an axis of rotation of the drive shaft. This results in a very simple design.

Also, a plurality of conveyor devices can be provided adjacent to one another which are drivable by a common drive shaft and which comprise respective support structures that can be pivoted independently of one another about the drive shaft's axis of rotation, wherein each supporting structure is supported at the support element by a separate jointed arm arrangement.

Furthermore, each jointed arm arrangement can be associated with a drive, wherein the drives are operable independently of each other. The support structures can thus be easily pivoted independently of one another in order thus to change the respective output region. This means that portions having incorrect weight can example.g. be sorted out on all lanes without interrupting the product flow on the respective other lanes.

According to an embodiment of the invention, each conveyor device may be formed as a band conveyor or belt conveyor, wherein in particular a conveyor belt or a conveyor belt arrangement revolves around the drive shaft and around a deflection roller supported on the support structure. The conveyor belt or the conveyor belt arrangement may represent the only connection between the drive shaft and the support structure. It is particularly advantageous in this respect that the respective conveyor belt is not enclosed, i.e. "trapped", between support components of the support structure. This results in particular in simplified maintenance and cleaning.

The or each support structure can include a pivot table with one or more guide surfaces or support surfaces for the conveyor belt or for the conveyor strip arrangement. Such a pivot table enables effective sorting of conveyed products to various output areas.

Each jointed arm assembly may comprise a four-joint link, where the support element forms a fixed point of the four-joint link. In particular, the or each jointed arm arrangement can comprise parallel kinematics with two parallel levers which may be of equal length being pivotably connected to the support structure at linkage points spaced from each other. In this respect, one of the parallel levers may be movably supported at the support element via a displacement lever. The displacement lever allows an end of the support structure to be displaced from the drive shaft while forming a free space interrupting the supporting connection between the support structure and the drive shaft.

The two parallel levers can each be pivotably connected to a coupling lever being in parallel to a connection line of the support structure linkage points. Pivoting this coupling lever results in a parallel pivoting of the supporting structure.

The axis of rotation of the drive shaft, a pivot axis of the displacement lever and a pivot axis of the coupling lever may be located in a common plane.

Embodiments of the invention also relate to a conveying line, which comprises at least one input conveyor, at least one apparatus as described above and at least one reception device or buffer device having a plurality of output regions. Furthermore, certain embodiments relate to a production line comprising at least one cutting apparatus for slicing products, in particular a high-performance slicer, and at least one conveying line as mentioned above. The conveying line can be arranged upstream of a packaging device which, for example, comprises a robot unit and/or a packaging machine.

The invention will be described in the following by way of example with reference to the accompanying drawings.

DETAILED DESCRIPTION

Figure 1:
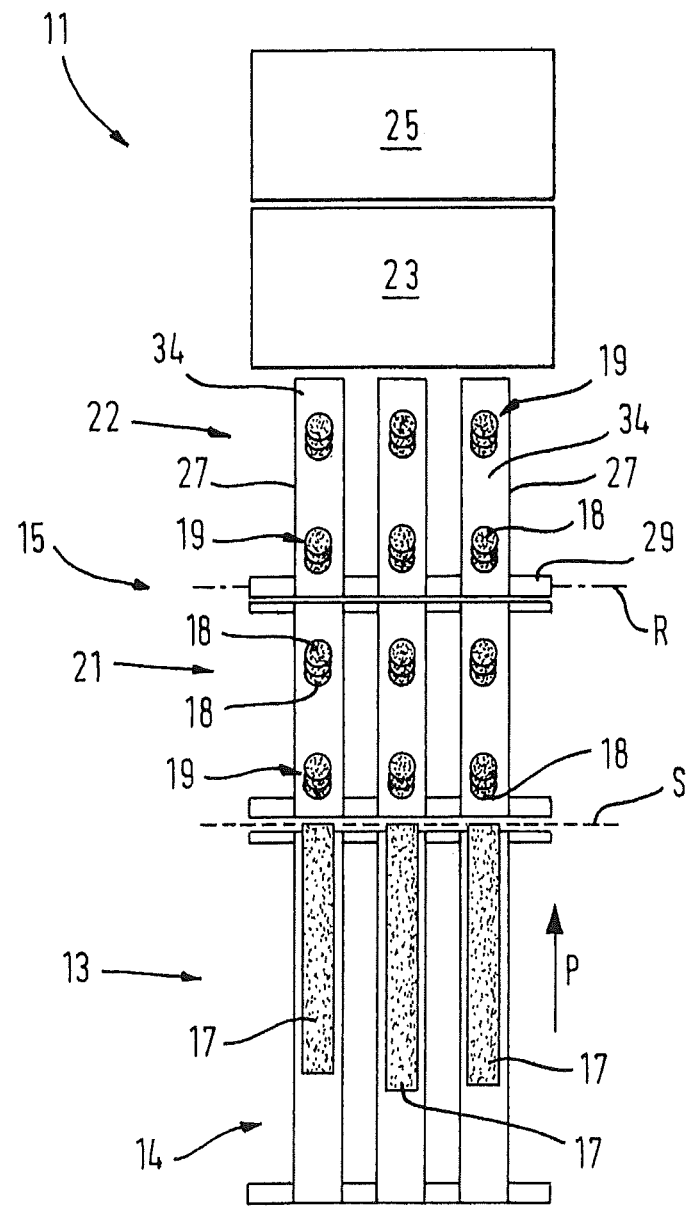
FIG. 1 shows a plan view of a production line comprising a cutting device for slicing food products, a plurality of product conveyor apparatuses and a packaging device.
Figure 2:
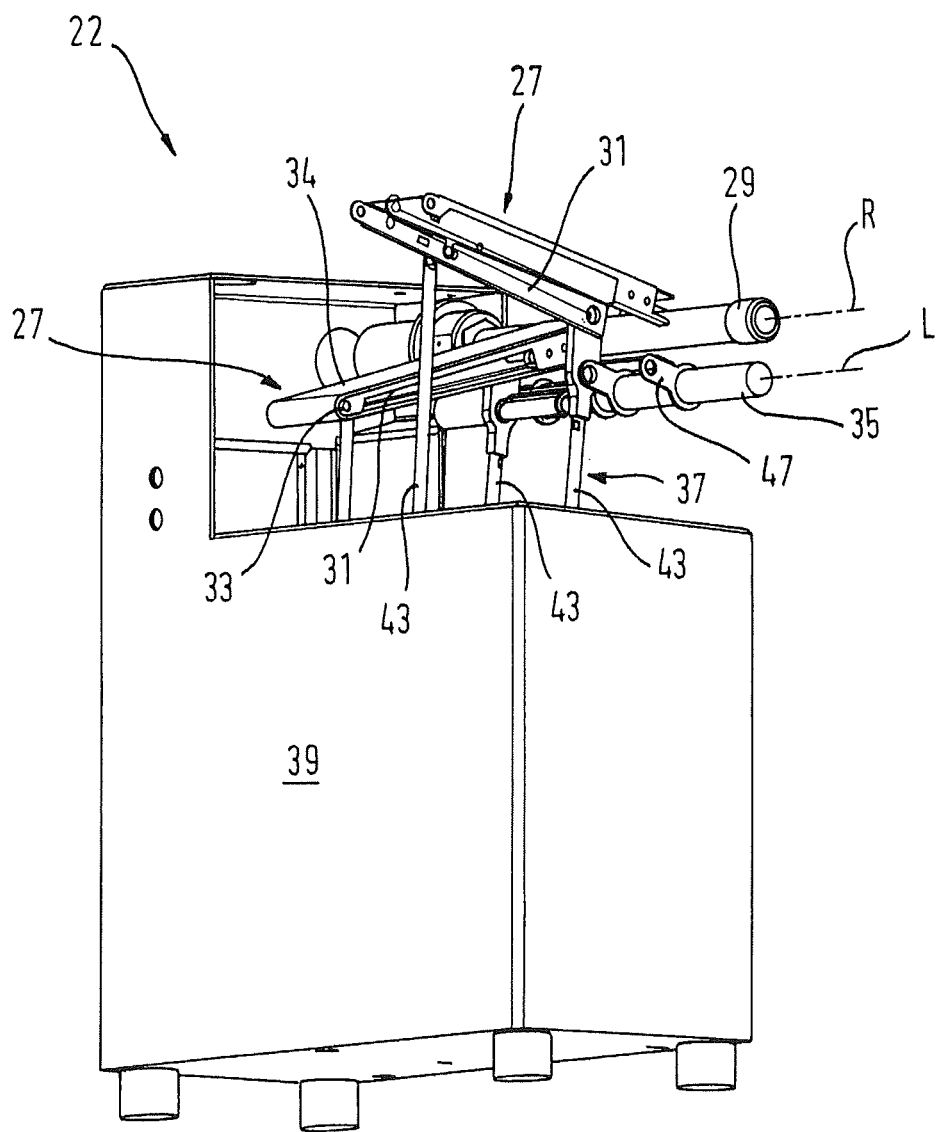
FIG. 2 shows a perspective view of an apparatus for conveying food products.
Figure 3:
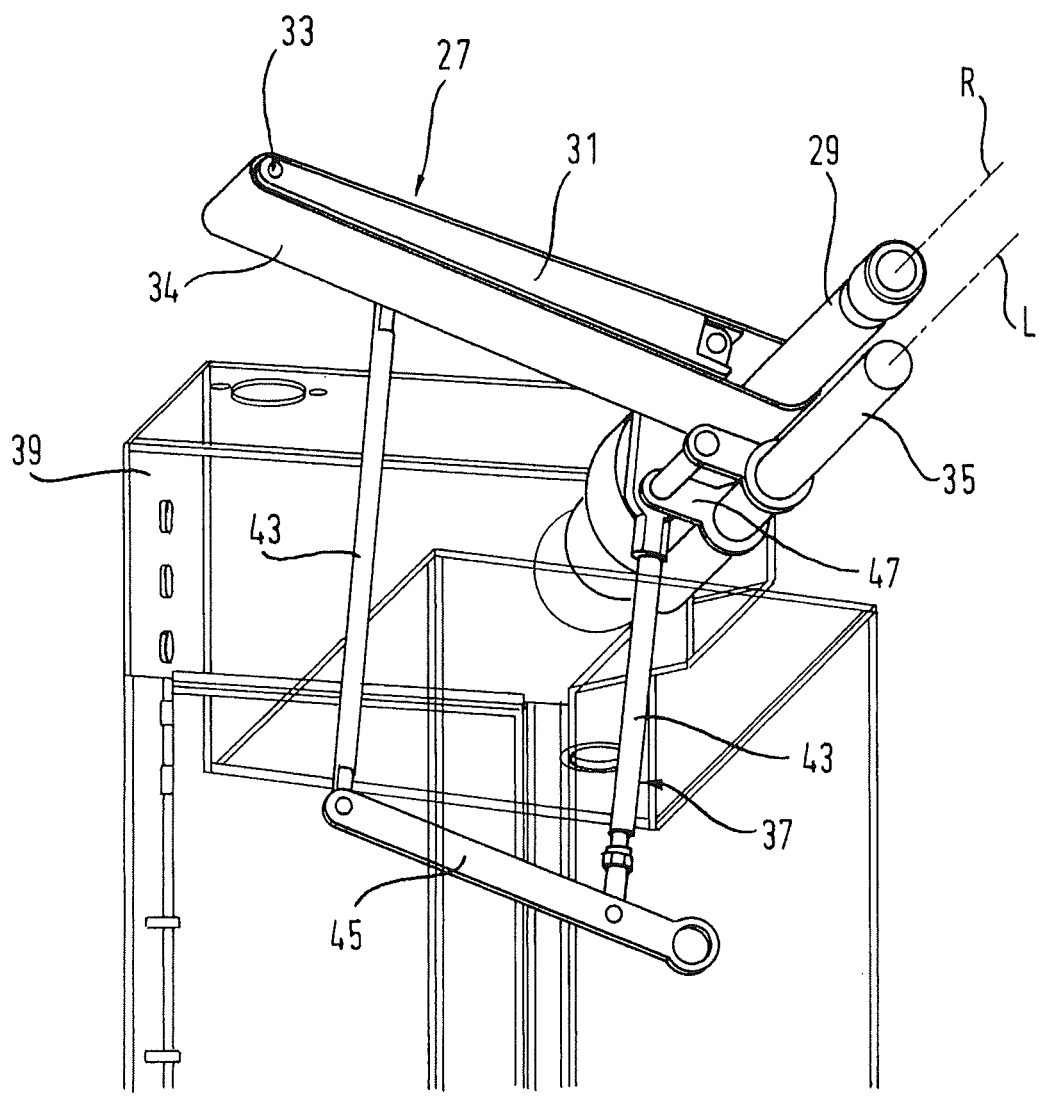
FIG. 3 is an enlarged partial view of the apparatus of FIG. 2.

FIG. 1 shows in simplified form a production line 11 for producing packaged portions, e.g. of slices of meat, sausage or cheese. A high-performance slicer 13 of the production line 11 comprises a product supply 14 which is adapted to deliver a plurality of products 17 next to one another along a product conveying direction P to a cutting plane S in which a common cutting blade (not shown) moves, in particular rotationally and/or revolving manner. The product slices 18 cut off by the cutting blade are delivered in individual product portions 19 to a multi-lane conveyor line 15 which comprises an input conveyor 21, a sorting conveyor 22, a buffer device 23 as well as a packaging device 25. The product portions 19 are in this manner supplied to the packaging device 25, with the sorting conveyor 22 being, inter alia, able to expel portions of incorrect weight from the product flow.

The sorting conveyor 22 will be described in more detail with reference to FIGS. 2 to 5. According to FIGS. 2 and 3, the sorting conveyor 22 comprises a plurality of conveyor devices arranged next to one another which are here formed as belt conveyors 27. The drive of the belt conveyors 27 takes place via a common drive shaft 29.

Figure 4:
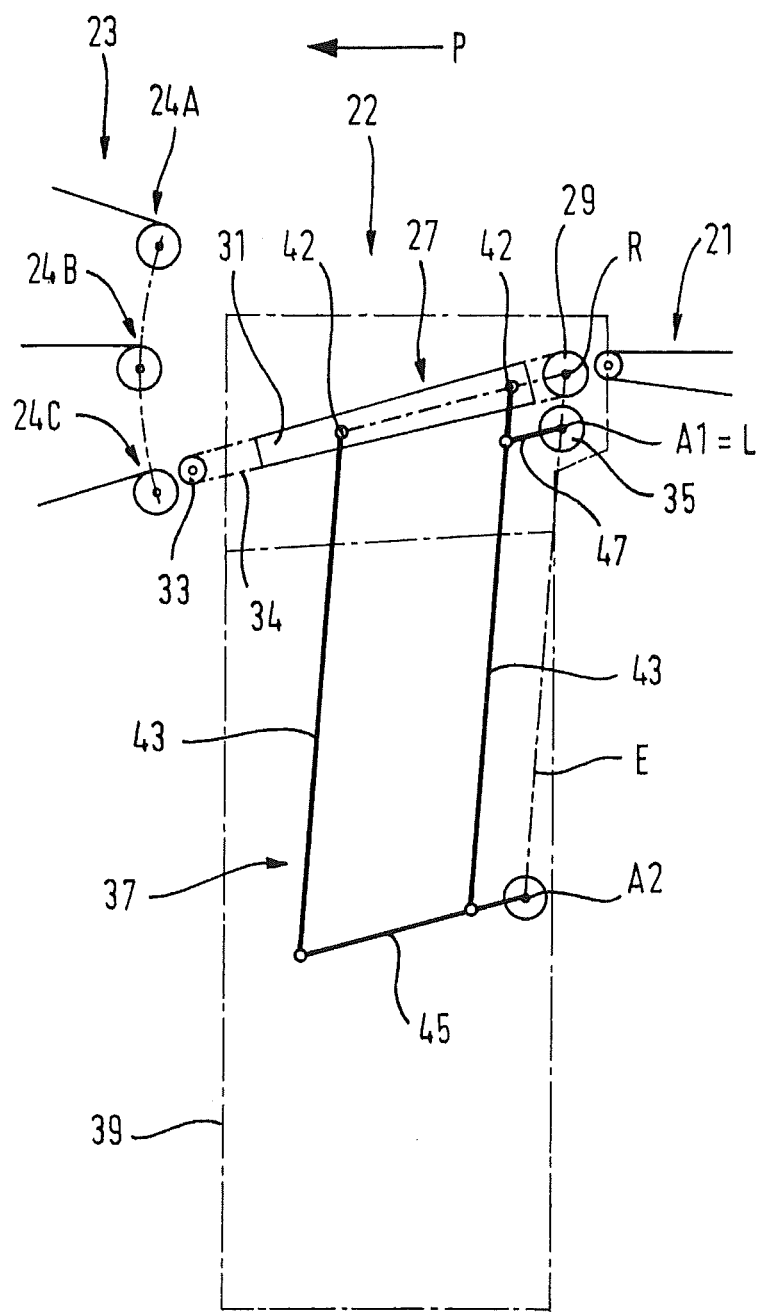
FIG. 4 is a simplified side view of the apparatus of FIG. 2 showing a rocker table in a first pivoted position.
Figure 5:
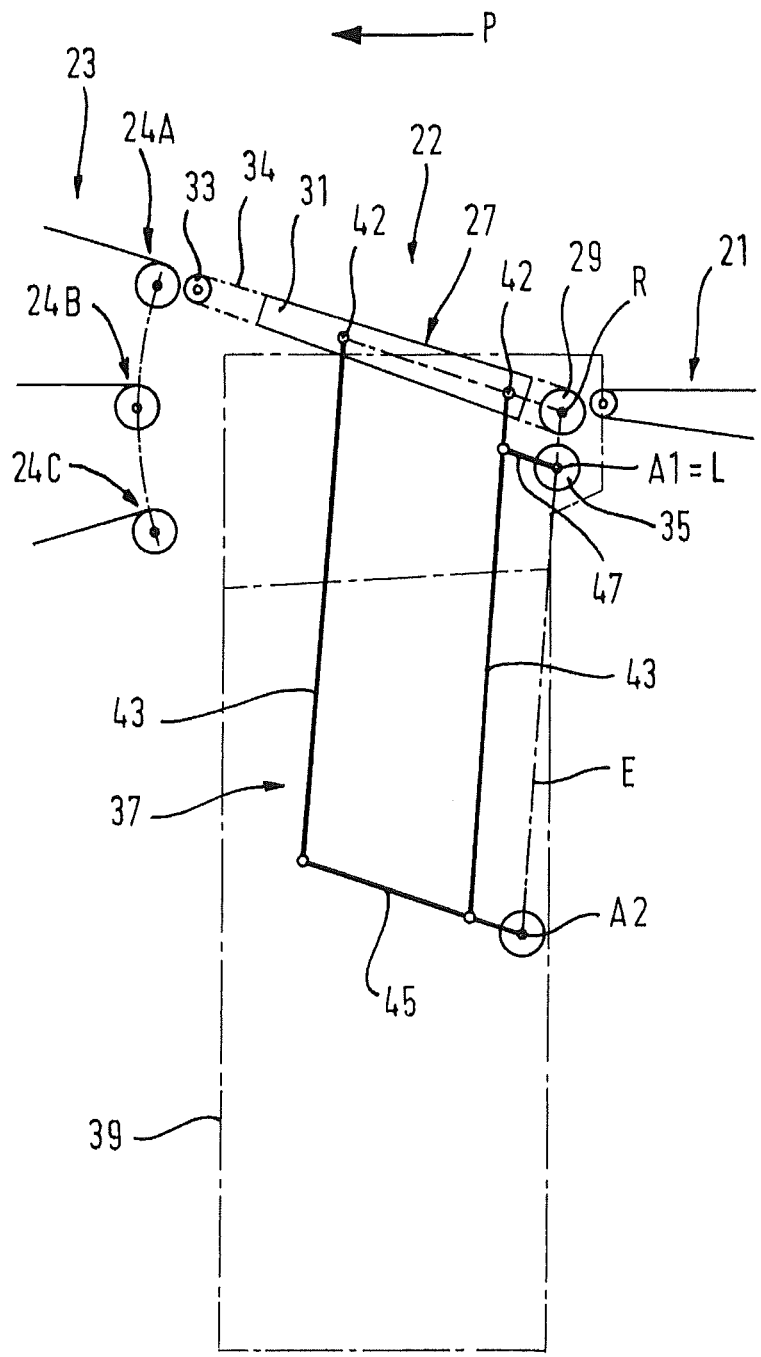
FIG. 5 shows the apparatus of FIG. 4, wherein the rocker table is in a second pivoted position.

With further reference to FIGS. 4 and 5, each belt conveyor 27 comprises a support structure in the form of a rocker table 31 at which a deflection roller 33 is rotatably supported. A conveyor belt 34 runs around the deflection roller 33 and around the drive shaft 29. The rocker table 31 not only carries the deflection roller 33, but also serves to guide and/or support the conveyor belt 34. Instead of the conveyor belt 34, an arrangement of a plurality of parallel revolving conveyor belts could also be provided.

A rigid support rod 35 is provided at a certain distance from the drive shaft 29 in parallel to it and is non-rotatably attached to a housing 39 of the sorting conveyor 22. Each rocker table 31 is pivotably supported at the support rod 35 by a jointed arm arrangement 37. There is, however, no mechanical supporting connection between the rocker tables 31 and the drive shaft 29, but only the drive-effective connection via the revolving conveyor belt 34.

Each jointed arm arrangement 37 comprises a parallel kinematic with two parallel levers 43 which are pivotally connected to the rocker table 31 at linkage points 42 spaced apart from each other. At the lever ends opposite the linkage points 42, the parallel levers 43 are pivotally connected to a coupling lever 45. The coupling lever 45 extends parallel to the connection line of the linkage points 42 and is pivotably supported in the housing 39 about a pivot axis A2. Furthermore, a displacement lever 47 is provided which, on the one hand, is pivotally connected to one of the parallel levers 43 and, on the other hand, is pivotably supported at the support rod 35 about a pivot axis A1. In this respect, the length of the displacement lever 47 corresponds to the length of the section of the coupling lever 45 protruding beyond the rear linkage point of the parallel lever 43 so that the axis of rotation R of the drive shaft 29, the pivot axis A2 of the coupling lever 45 and the pivot axis A1 of the displacement lever 27, which coincides with the longitudinal axis L of the support rod 35, lie in a common plane E.

A movement of the jointed arm arrangement 37, for example by pivoting the coupling lever 45, by pivoting the displacement lever 47 or by linearly displacing one of the two parallel levers 43 effects a pivoting of the rocker table 31 about the axis of rotation R of the drive shaft 29 which thus forms a virtual pivot axis of the rocker table 31. By pivoting the rocker tables 31, the product portions 19 can be supplied to one of a plurality of output regions 24A, 24B, 24C of the buffer device 23 which are shown in simplified form in FIGS. 4 and 5 as belt conveyors arranged above each other. A drive for moving the jointed arm arrangement 37 can be effected at any point of the kinematic chain extending between the support rod 35 and the rocker table 31. Each jointed arm arrangement 37 is typically associated with a separate drive, with the drives being operable independently of each other in order thus to be able to perform an individual change of the output region 24A, 24B, 24C at each of the belt conveyors during the conveying of the product portions 19. Depending on the output region 24A, 24B, 24C, the product portions 19 are either supplied to the packaging device 25 (FIG. 1) or, for example, to a collection container, not illustrated, for portions of incorrect weight.

Since the only mechanical connection between the rocker table 31 and the drive shaft 29 is the revolving conveyor belt 34, the drive shaft 29 can be of a relatively simple design. Expensive roller element bearings and seals can in particular be dispensed with which would be necessary for supporting the rocker tables 31 at the drive shaft 29 which rotates at relatively high speeds. The pivotal connection between the between the displacement lever 47 and the rigid support rod 35 can be accomplished by simple and robust slide bearings. In this manner, a product conveyor apparatus with multiple rocker tables 31 arranged side by side and tiltable independently from each other can be produced in a simple manner, without having to abandon the concept of the common drive shaft 29. Furthermore, cleaning of the sorting conveyor 22 is facilitated. Due to the lack of roller element bearings, including their associated bearing seats and seals, a more effective assembly and an easier service is possible.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An apparatus for conveying products comprising:
   at least one conveyor device which is drivable by a drive shaft in order to supply said products to one of a plurality of output areas;
   wherein said conveyor device comprises a support structure which is pivotable for individually changing said output regions about an axis of rotation of the drive shaft; and
   wherein said support structure is pivotably supported by a jointed arm arrangement at a support element spaced apart from said drive shaft such that, by moving said jointed arm arrangement, said support structure is pivotable about said axis of rotation of said drive shaft, wherein the jointed arm arrangement comprises parallel kinematics with two parallel levers pivotably connected to the support structure at linkage points spaced apart from each other.

2. An apparatus according to claim 1, wherein there is no supporting connection between said support structure and said drive shaft.

3. An apparatus according to claim 1, wherein said support element extends parallel to said drive shaft.

4. An apparatus according to claim 1, wherein a plurality of conveyor devices are provided adjacent to one another which are drivable by a common drive shaft and which comprise respective support structures which can be pivoted independently of one another about the axis of rotation of said drive shaft, with each support structure being supported at said support element by a separate jointed arm arrangement.

5. An apparatus according to claim 4, wherein a drive is associated with each jointed arm arrangement, with said drives being operable independently of each other.

6. An apparatus according to claim 1, wherein each conveyor device is formed as at least one of a belt conveyor or strip conveyor.

7. An apparatus according to claim 1, wherein at least one of a conveyor belt or a conveyor belt arrangement revolves around said drive shaft and around a deflection roller supported at said respective support structure.

8. An apparatus according to claim 1, wherein the support structure comprises a pivot table with one or more guide surfaces or support surfaces for at least one of a conveyor belt or a conveyor strip arrangement.

9. An apparatus according to claim 1, wherein the jointed arm arrangement comprises a four-part link, with said support element forming a fixed point of said four-part link.

10. An apparatus according to claim 1, wherein the two parallel levers are of equal length.

11. An apparatus according to claim 1, wherein one of said parallel levers is movably supported at said support element via a displacement lever.

12. An apparatus according to claim 1, wherein said two parallel levers are each pivotably connected to a coupling lever being in parallel to a connection line of said supporting structure linkage points.

13. An apparatus according to claim 12, wherein said axis of rotation of said drive shaft, a pivot axis of said displacement lever and a pivot axis of said coupling lever lie in a common plane.

14. A conveyor line comprising:
   at least one input conveyor; and
   at least one apparatus for conveying products, said apparatus comprising at least one conveyor device which is drivable by a drive shaft in order to supply said products to one of a plurality of output areas, wherein said conveyor device comprises a support structure which is pivotable for individually changing said output regions about an axis of rotation of the drive shaft, wherein said support structure is pivotably supported by a jointed arm arrangement at a support element spaced apart from said drive shaft such that, by moving said jointed arm arrangement, said support structure is pivotable about said axis of rotation of said drive shaft, wherein the jointed arm arrangement comprises parallel kinematics with two parallel levers pivotably connected to the support structure at linkage points spaced apart from each other, and
   at least one reception device or buffer device with a plurality of output regions for receiving said conveyed products.

15. A production line comprising:
   at least one cutting device for slicing products; and
   at least one conveyor line comprising:
      at least one input conveyor;
      at least one apparatus for conveying products, said apparatus comprising at least one conveyor device which is drivable by a drive shaft in order to supply said products to one of a plurality of output areas, wherein said conveyor device comprises a support structure which is pivotable for individually changing said output regions about an axis of rotation of the drive shaft, wherein said support structure is pivotably supported by a jointed arm arrangement at a support element spaced apart from said drive shaft such that, by moving said jointed arm arrangement, said support structure is pivotable about said axis of rotation of said drive shaft, wherein the jointed arm arrangement comprises parallel kinematics with two parallel levers pivotably connected to the support structure at linkage points spaced apart from each other; and at least one reception device or buffer device with a plurality of output regions for receiving said conveyed products.

16. A production line according to claim 15, wherein said conveyor line is arranged upstream of a packaging device.

17. A production line according to claim 16, wherein said packaging device comprises at least one of a robot unit and a packaging machine.

* * * * *